United States Patent
Laakkonen et al.

(10) Patent No.: US 9,005,030 B2
(45) Date of Patent: Apr. 14, 2015

(54) SYSTEM AND METHOD FOR SHARING SCORE EXPERIENCES

(71) Applicant: Applifier Oy, Helsinki (FI)

(72) Inventors: Jussi Laakkonen, Vantaa (FI); Olli Sinerma, Espoo (FI)

(73) Assignee: Applifier Oy, Helsinki (FI)

( * ) Notice: Subject to any disclaimer, the term of this patent is extended or adjusted under 35 U.S.C. 154(b) by 0 days.

(21) Appl. No.: 13/691,046

(22) Filed: Nov. 30, 2012

(65) Prior Publication Data
US 2014/0156037 A1    Jun. 5, 2014

(51) Int. Cl.
*A63F 13/00*    (2014.01)
*A63F 13/30*    (2014.01)
(Continued)

(52) U.S. Cl.
CPC ............... *A63F 13/12* (2013.01); *A63F 13/86* (2014.09); *H04N 21/4781* (2013.01); *A63F 2300/402* (2013.01); *A63F 2300/634* (2013.01); *A63F 2300/407* (2013.01); *A63F 2300/572* (2013.01); *H04N 21/6125* (2013.01);
(Continued)

(58) Field of Classification Search
CPC ............ G07F 17/3225; G07F 17/3295; G07F 17/3223; A63F 13/12; A63F 2300/554; A63F 2300/572; A63F 2300/577; A63F 2300/634; A63F 13/00; A63F 2300/402; A63F 2300/407; A63F 2300/552; A63F 2300/61; A63F 13/86; A63F 2300/5546; A63F 2300/556; A63F 2300/403; H04N 21/4781; H04N 21/6125; H04N 21/2743; H04N 21/6377; H04N 21/658; H04N 21/44222; H04N 21/6131; H04L 65/4076; H04L 65/605; G06Q 50/01

USPC .................. 463/40–43; 700/91–92
See application file for complete search history.

(56) References Cited

U.S. PATENT DOCUMENTS 5,410,698 A    4/1995    Danneels et al.
5,699,275 A    12/1997   Beasley et al.
(Continued)

FOREIGN PATENT DOCUMENTS

WO    2013006226 A1    1/2013

OTHER PUBLICATIONS

"Intel IPP-Open Source Computer Vision Library"; Intel Software; Intel IPP-Open Source Computer Vision Library (OpenCV) FAQ | Intel Developer Zone; Mar. 25, 2012.

*Primary Examiner* — Justin Myhr
(74) *Attorney, Agent, or Firm* — Ziegler IP Law Group, LLC

(57) ABSTRACT

A system for sharing score experiences includes one or more devices on which one or more games are played, a gameplay experience service arrangement and a communication arrangement for communicatively coupling the devices to the gameplay experience service arrangement. The devices include computing hardware for executing one or more games software products for implementing the one or more games when executed upon the computing hardware. The devices are operable to record a gameplay experience (GEV) played thereupon including an associated score, wherein the one or more devices are operable to upload their recorded gameplay experiences (GEV) and associated score to the gameplay experience service arrangement which maintains a score list corresponding to the uploaded gameplay experiences. The score list is accessible to the devices for identifying relative gameplay performances of users of the devices, for example via replaying of the recorded gameplay experiences.

18 Claims, 4 Drawing Sheets

(51) Int. Cl.
*A63F 13/86* (2014.01)
*H04N 21/478* (2011.01)
*H04N 21/61* (2011.01)
*H04N 21/2743* (2011.01)
*H04N 21/6377* (2011.01)
*H04N 21/658* (2011.01)
*H04L 29/06* (2006.01)

(52) U.S. Cl.
CPC .......... *A63F 2300/552* (2013.01); *A63F 13/00* (2013.01); *H04N 21/2743* (2013.01); *A63F 2300/554* (2013.01); *H04N 21/6377* (2013.01); *H04N 21/658* (2013.01); *H04L 65/605* (2013.01); *H04L 65/4076* (2013.01); *A63F 2300/538* (2013.01); *A63F 2300/577* (2013.01); *A63F 2300/61* (2013.01)

(56) References Cited

U.S. PATENT DOCUMENTS

| | | | |
|---|---|---|---|
| 6,405,171 | B1 | 6/2002 | Kelley |
| 7,171,674 | B2 | 1/2007 | Arrouye et al. |
| 7,801,931 | B2 | 9/2010 | Tunar et al. |
| 2007/0060359 | A1* | 3/2007 | Smith .............. 463/42 |
| 2008/0139301 | A1* | 6/2008 | Holthe .............. 463/25 |
| 2009/0131177 | A1* | 5/2009 | Pearce .............. 463/43 |
| 2009/0258708 | A1* | 10/2009 | Figueroa .............. 463/43 |
| 2011/0107220 | A1* | 5/2011 | Perlman .............. 715/720 |
| 2011/0151971 | A1* | 6/2011 | Altshuler et al. .............. 463/30 |
| 2011/0230246 | A1* | 9/2011 | Brook et al. .............. 463/9 |
| 2012/0083331 | A1* | 4/2012 | Carpenter et al. .............. 463/25 |
| 2013/0198334 | A1* | 8/2013 | Ikenaga et al. .............. 709/217 |

* cited by examiner

SYSTEM AND METHOD FOR SHARING SCORE EXPERIENCES

FIELD OF THE INVENTION

The present invention relates to systems for sharing gameplay score experiences. Moreover, the present invention also relates to methods of operating systems for enabling gameplay score experiences to be shared. Furthermore, the present invention relates to software products recorded on machine-readable data storage media, wherein the software products are executable upon computing hardware for implementing aforesaid methods.

BACKGROUND OF THE INVENTION

Human beings often display simple primate behaviour, as a consequence of human evolution from ape-like creatures as postulated by Charles Darwin. Simple primate behaviour, as observed in contemporary situations amongst chimpanzees, includes individuals operating in peer groups and individuals competing within given peer groups to attain high peer positions within the given peer groups. Such behaviour is observed for groups of humans when playing computer-implemented games, for example in games arcades, frequented by children and young adults for group entertainment. A given individual who is able to play a particular arcade game to a high level of skill and proficiency wins special respect from other individuals within a given games-playing peer group. Contemporary arcade games allow for users to enter their initials together with their high score for prestige purposes, thereby asserting their peer position.

In a published U.S. Pat. No. 7,611,410, there is described a method for verifying that a shared high score in an online environment is true. In the method described, a player terminal receives a game program downloaded from an online game server, and the game is then played on the player terminal. A plurality of players execute the same online game, and mutually compete for achieving a high score when playing the game. The scores achieved by the players, together with an operation history of the players, are transmitted to the online game server. For the highest score achieved, a corresponding play of the game which resulted in the highest score is reproduced, based the operation history received by the online server; the fairness of the highest score is thereby verified based upon the score attained by executing the reproduction.

Moreover, in a published U.S. Pat. No. 6,224,485, there is described a high-score sharing display system for a video game, wherein the system includes a game controller of the video game. When a high score is achieved during playing of the game, the game controller is operable to store game sequences associated with achieving the high score. Subsequently, the stored game sequences can be utilized to simulate the played game as represented by the high score for verification purposes.

In the foregoing, there are employed, in effect, high-score leaderboards, namely scoreboards, that require their associated games to employ a deterministic game engine, namely so that the games can be reproduced with an identical gameplay each time the scores in the high-score leaderboards are to be reproduced, for example for training or verification purposes. However, a large proportion of contemporary computer-base games employ simulations based on physics, for example based on random number generators, that render their associated games engines non-deterministic in operation, resulting in a gameplay experiences not being reproducible based upon gameplay inputs provided to achieve the high scores. Moreover, contemporary games are generated from games engines which are responsive to gameplay inputs from users, wherein the gameplay inputs are not transportable to other games, for example in other game-playing environments.

Competitive players of games enjoy games with leaderboards showing highest scores with identification of corresponding players, because it allows for bragging by those players attaining the highest scores; in other words, the leaderboards provide players with "bragging rights". Moreover, for those players who are not able to aspire initially to the highest scores, the leaderboards provide a mechanism for personal improvement in game playing.

Game playing, for example via the Internet, is financed either on a per-play basis, or by advertising content presented concurrently to users whilst engaged in game playing activities. In order to increase revenues, competition between players of a given game result in the game being played more frequently, and hence potentially higher revenues for the proprietors of the game proprietors and/or games service providers.

SUMMARY OF THE INVENTION

An object of the present invention is to provide a system for sharing gameplay score experiences, namely gameplay experiences via leaderboards, in a manner which allows for better sharing of playing experiences resulting in high scores on an associated scoreboard.

Moreover, an objective of the present invention is to provide a method of sharing gameplay score experiences, namely gameplay experiences via leaderboards, which allows for better sharing of playing experiences resulting in high scores on an associated scoreboard.

Furthermore, an object of the present invention is to provide software products for sharing gameplay score experiences, namely gameplay experiences via leaderboards, which allows for better sharing of playing experiences resulting in high scores on the scoreboard.

According to a first aspect of the present invention, there is provided a system for sharing score experiences as claimed in claim 1: there is provided a system for sharing score experiences, wherein the system includes one or more devices on which one or more games are played, a gameplay experience service arrangement and a communication arrangement for communicatively coupling the one or more devices to the gameplay experience service arrangement, wherein the one or more devices include computing hardware for executing one or more games software products for implementing the one or more games when executed upon the computing hardware, wherein the one or more devices are operable to record a gameplay experience (GEV) played thereupon including an associated score, wherein the one or more devices are operable to upload their recorded gameplay experiences and associated score to the gameplay experience service arrangement which maintains a score list corresponding to the uploaded gameplay experiences, and wherein the score list is accessible to the one or more devices for identifying relative gameplay performances of users of the one or more devices.

The aspects of the disclosed embodiments advantageously provide a score list together with verification of performance presented on the score list. And that such verification can happen outside of the original game.

Optionally, in the system, uploaded gameplay experiences corresponds to one or more data streams recorded in real-time in the devices during playing of games thereupon. More optionally, in the system, the one or more data streams include at least one of: UserFace Video, Game Video, Mic Sound, Game Sound, Game Control, Game Stat, UI Data, Game Events.

Optionally, in the system, the one or more data streams generated at the one or more devices are user-editable before being uploaded to the gameplay experience service arrangement.

Optionally, in the system, the score list is accessible via the one or more devices, and the score list includes links for replaying gameplay experiences associated with scores presented on the score list.

Optionally, in the system, the score list is maintained in an Internet web site, and accessible from the one or more devices using browser software or through other applications and services in the one or more devices.

Optionally, in the system, the one or more games software products are host games software products into which one or more software components from a GESW API software library have been incorporated.

Optionally, in the system, the one or more devices are wireless-enabled devices implemented by way of at least one of: a smart phone, a laptop computer, a personal computer, a pad computer, a tablet computer.

According to a second aspect of the invention, there is provided a method of sharing score experiences using a score sharing system, wherein the method includes:
(a) using one or more devices of the system for playing one or more games;
(b) communicatively coupling the one or more devices via a communication arrangement to a gameplay experience service arrangement, wherein the one or more devices include computing hardware for executing one or more games software products for implementing the one or more games when executed upon the computing hardware;
(c) recording on the one or more devices a record a gameplay experience (GEV) played thereupon including an associated score;
(d) uploading form the one or more devices their recorded gameplay experiences and associated score to the gameplay experience service arrangement; and
(e) maintaining a score list corresponding to the uploaded gameplay experiences, and wherein the score list is accessible to the one or more devices for identifying relative gameplay performances of users of the one or more devices.

The invention is of advantage in that the method provides a score list together with verification of performance presented on the score list. Additionally sharing of gameplay experience provides enjoyable user experience for the spectators. Persons can enjoy gaming moments of players in the score list for leisure and also for learning how to play the game better.

Optionally, in the method, uploaded gameplay experiences corresponds to one or more data streams recorded in real-time in the one or more devices during playing of games thereupon. More optionally, in the method, the one or more data streams include at least one of: UserFace Video, Game Video, Mic Sound, Game Sound, Game Control, Game Stat, UI Data, Game Events.

Optionally, in the method, the one or more data streams generated at the devices are user-editable before being uploaded to the gameplay experience service arrangement.

Optionally, in the method, the score list is accessible via the one or more devices, and the score list includes links for replaying gameplay experiences associated with scores presented on the score list.

Optionally, in the method, the score list is maintained in an Internet web site, and accessible from the devices using browser software in the devices.

Optionally, in the method, the one or more games software products are host games software products into which one or more software components from a GESW API software library have been incorporated.

Optionally, in the method, the one or more devices are wireless-enabled devices implemented by way of at least one of: a smart phone, a laptop computer, a personal computer, a pad computer, a tablet computer.

According to a third aspect of the present invention, there is provided a software product recorded on machine-readable data storage media, wherein the software product is executable upon computing hardware for implementing a method pursuant to the second aspect of the invention.

It will be appreciated that features of the invention are susceptible to being combined in various combinations without departing from the scope of the invention as defined by the appended claims.

DESCRIPTION OF THE DIAGRAMS

Embodiments of the present invention will now be described, by way of example only, with reference to the following diagrams wherein.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS OF THE INVENTION

In overview, the present invention is concerned with systems including one or more leaderboards, namely scoreboards, for displaying scores of players of a game. Known implementations of computer games are generally non-deterministic and thus do not allow replay of gameplay actions input to the game required for achieving highest scores on the one or more leaderboards, either within the games or via a separate service. In view of such a non-deterministic nature of contemporary computer games, the present invention is concerned with recording execution of computer games as experienced by users when playing the games. Such recording is beneficially implemented as a recording of a computer game as the game is being played by a given user in a form of a video stream, and also a camera view of the given user and/or a game console being employed by the given user to play the game; there is thereby generated a game experience video (GEV). Beneficially, the GEV can be made accessible in a high score display to any user, for example through use of an arbitrary game playing software application.

Figure 1:
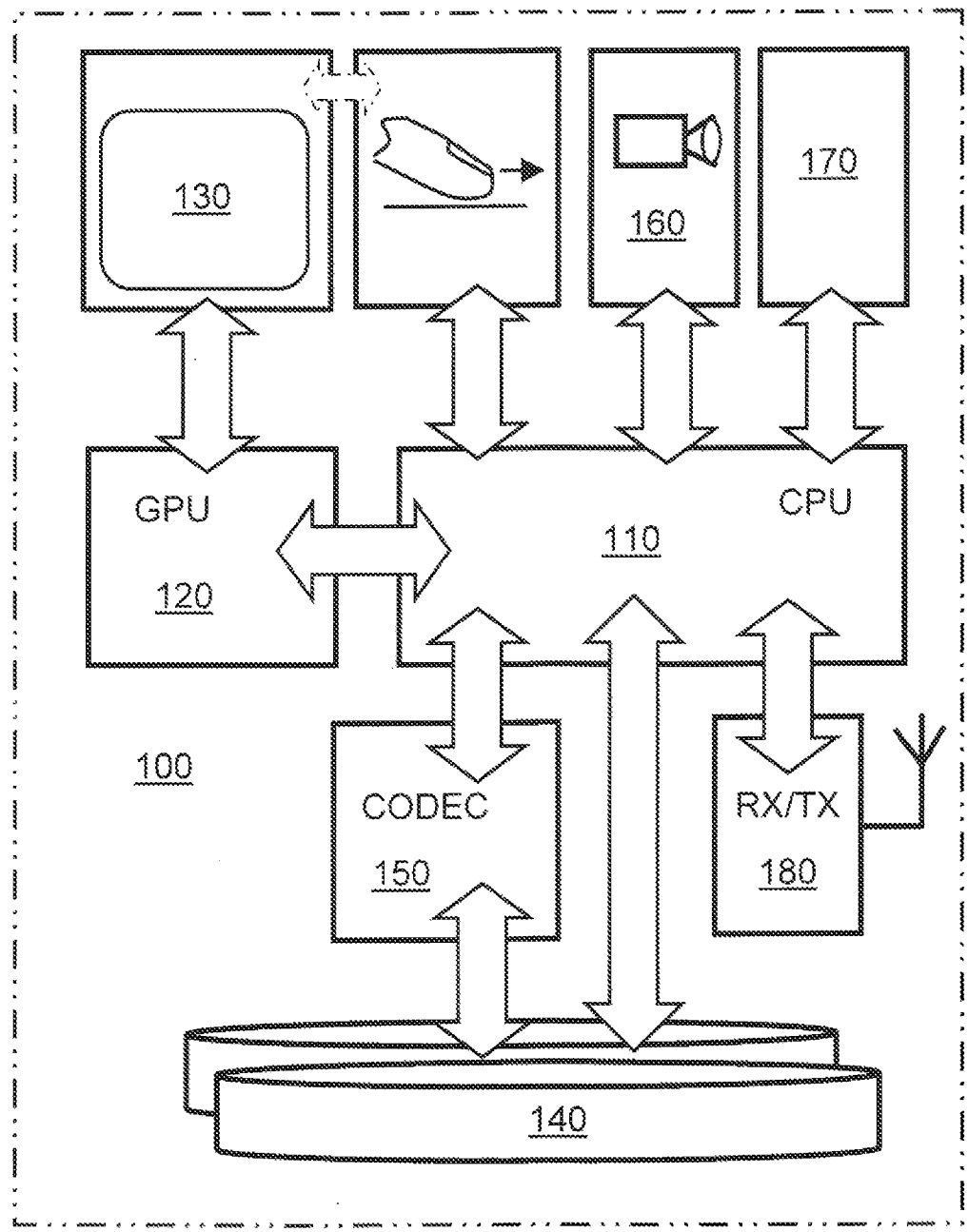
FIG. 1 is an illustration of a device for use in implementing the present invention.

Referring to FIG. 1, there is shown an illustration of a portable computing device 100 which is operable to execute one or more games software products on computing hardware 110 therein, for example a central processor unit (CPU) 110, for providing an environment in which a given user of the portable computing device 100 is capable of playing a game. Optionally, the portable computing device 100 is implemented as a smart phone, a computing pad, a personal computer (PC) or similar type of device. Graphics associated with the games, implemented by execution of the one or more games software products, are handled via a graphics processing unit (GPU) 120. The games are presented to the given user via a display 130 of the device 100; optionally, the display 130 is implemented as a touch-sensitive display. The one or more games software products includes at least one game experience recording software (GESW) component. The GESW beneficially consists of a set of library software components, which a developer of software games can incorporate as an integral part of any games software, for example compiled as a monolithic integrated software games host product, wherein the software games host product includes integrated game recording, game sharing and game playback functionalities (GEV).

The GESW is operable to employ an application program interface (API) to capture snapshots of the information content of the aforesaid graphics processing unit (GPU) 120 when in operation being fed data from the central processor unit (CPU) 110, namely to acquire snapshots of images rendered to the given user via the display 130. Beneficially, in order that such snapshots should not utilize too much data storage space in a data memory 140 of the device 100, data corresponding to the captured snapshots are passed via a hardware encoder 150 which generates corresponding compressed encoded data for storage in the data memory 140, thereby creating a video, namely "Game Video", which is stored in the data memory 140. The game host software executing upon the central processor unit (CPU) 110 is optionally operable to control the API to capture images to the Game Video which is different to that which is presented to the given user via the display 130, for example to include either fewer or more elements, for example to exclude interfacing graphical elements presented to the given user on the display 130, but which are not of relevance when the Game Video is later reproduced for the benefit of other users of the game host software.

Beneficially, the device 100 includes a major rear planar surface, and a major front planar surface including the display 130 together with a camera 160, which faces towards the given user of the device 100. When the GESW software is executing upon the central processor unit (CPU) 110, the camera 160 captures a view of a face region of the given user and provides a corresponding signal which is recorded as a data stream, namely UserFaceVideo, in the data memory 140, together with time stamps for temporally synchronizing with other data streams recorded in the data memory, for example for synchronizing to the aforesaid Game Video. Depending upon implementation of the GESW software, the captured image of the given user is optionally presented in an associated window presented to the given user via the display 130 during game-playing activities. Optionally, the signal from the camera 160 is compressed and encoded in the hardware encoder 150 before being recorded in the data memory 140, thereby reducing a rate at which the data memory 140 is filled with data during game-playing activities. Moreover, the GESW can also be configured to record gestures of the given user, namely UI Data, in the display 130 implemented as a touch screen. Furthermore, the GESW can also be configured to record other sensor data from other sensors 170 as a stream, namely Sensor Data, to the data memory 140, for example accelerometer signals pertaining to movement of the device 100, magnetometer signals pertaining to an angular orientation of the device 100, location signals identifying a spatial location of the device 100, a temperature of the device 100 during game-playing activities, and so forth. Additionally, control inputs provided by the given user via controls of the device 100 are also recorded as a stream in the data memory 140, namely as Game Control. Yet additionally, the GESW is operable to record sounds from a microphone of the device 100, namely as Mic Sound, as a separate data stream in the data memory 140, together with temporal information for enabling the Mic Sound stream to be temporally synchronized to other of the aforesaid data streams; this enables gasps of pleasure and/or exasperation emitted by the given user during game-playing activities to be recorded. Thus, the GESW is optionally configurable to record the Mic Sound data stream separately from the Game Sound data stream.

In operation, during game-playing activities on the device 100, the GESW records gameplay events, for example attaining a high score, successful completion of a given task in the game, and so forth, namely Game Events; Game Events is recorded together with temporal information pertaining to when the events occurred during the game-playing activities. Moreover, the GESW is operable to record various game statistics, namely Game Stat, which are, for example, indicative of performance of the given user when playing a game, for example reaction time, percentage of successful shots, number of fouls, and so forth. The GESW can employ its API to add, change, remove and annotate the Game Events in real-time in a manner indicative of the given user's gameplay experience, for example in a manner to make the gameplay more entertaining and exciting for other users to enjoy when subsequently replayed later; such annotations can include, for example, personalized congratulatory messages. Moreover, the API of the GESW enables the given user to select which parts of the recorded gameplay experience are to be shared with other users; for example, the given user can elect, via the API of the GESW, for only highlights of a gameplay experience to be shared with other users, for example other users in a mutually social media group to the given user.

The aforesaid data streams, namely UserFaceVideo, Game Video, Mic Sound, Game Sound, Game Control, Game Stat, UI Data, Game Events and such like, are recorded in the data memory 140, together with temporal data which enables the data streams to be mutually temporally synchronized when replayed for the benefit of the other users and/or the given user. Beneficially, selection and management of recordings of the data streams are handled via GESW library software components as aforementioned. Thus, the API of the GESW allows for a games developer to set rules for recording and sharing the data streams recorded in the data memory 140 of the device 100. The recorded data streams in data memory 140 constitute a gameplay experience which can be shared, for example via wireless communication via a wireless interface RX/TX 180 of the device 100, through a communication network, for example a cellular wireless communication network such as 3G or 4G, to devices of other users; optionally, dissemination of the gameplay experience occurs via a gameplay experience service implemented using one or more data servers which are operable to buffer and record the communicated data from the device 100 of the given user; such service will be elucidated in more detail later.

Figure 2:
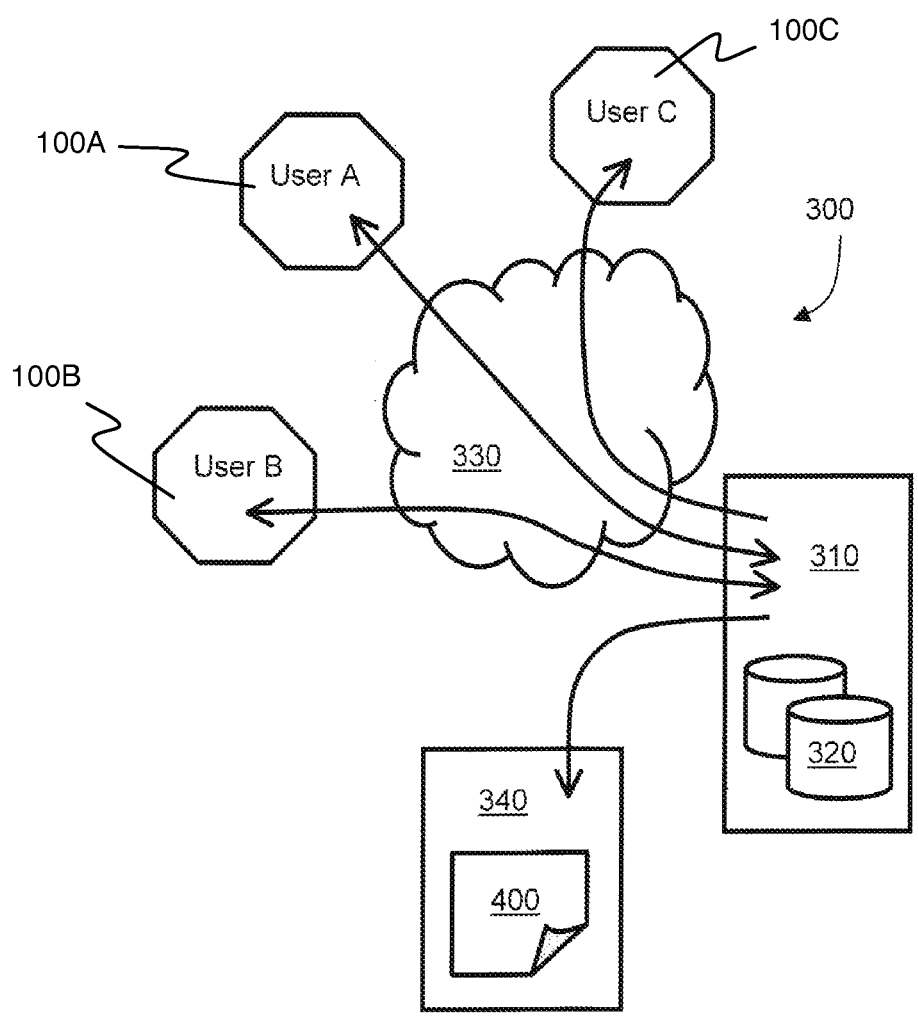
FIG. 2 is an illustration of an embodiment of the present invention, namely a score experience sharing system.

Referring next to FIG. 2, there is shown a system for sharing gameplay experiences including sharing scoring experiences; the system is indicated generally by 300. The system 300 includes a gameplay experience sharing service 310 implemented by way of one or more data servers 320 coupled via a communication network 330, for example implemented via a wireless communication network and/or the Internet, to three devices 100A, 100B, 100C. Optionally, the one or more data servers 320 are implemented in a cloud computing environment. The devices 100A, 100B, 100C are beneficially implemented in a similar manner to the device 100 illustrated in FIG. 1. The devices 100A, 100B, 100C are beneficially provided with the aforesaid GESW software. Moreover, the devices 100A, 100B, 100C are operable to function as gameplay terminals and can be implemented using PC's, lap-top computers, tablet computers, pad computers, smart phones and similar.

Operation of the system 300 will now be described. The device 100A is employed by the given user A to play a game which is recorded using its GESW software components as a plurality of data streams in its data memory 140 as aforementioned. The given user A of the device 100A is able to instruct, for example after editing by the given user A, the device 100A to upload the data streams from the data memory 140 to the gameplay experience sharing service 310 including the high score of the given user A with a record of how the given user A achieved the high score; the gameplay experience sharing service 310 is operable to store, namely record, the uploaded data streams from the device 100A in the one or more data servers 320. Optionally, the gameplay experience sharing service 310 keeps a record of scores of other users who have played the same game as the given user A for comparison purposes. The gameplay experience sharing service 310 is able to download the data streams uploaded by the given user A to other users, for example to the users B and C of devices 100B, 100C respectively. Such downloading, namely sharing, is beneficially transcoded to various communication bitrates to support streaming over networks with various bandwidths, and then transferred via the communication network 330 to the other users of the device 100B, 100C. Optionally, the communication network 330 functions in a point-to-point connection manner and/or in a peer-to-peer communication manner.

The user B via his/her device 100B is able to access the gameplay experience sharing service 310, depending upon credentials of the user B and his/her associated settings, for sharing with other users, for example "share-to-all", "share-to-friends", "share-to-private" and so forth. The device 100B, as aforesaid, has at least one games software product installed, wherein the games software product includes aforesaid GESW API components. Optionally, the device 100B has similar functionalities to the device 100A. Moreover, the device 100B can be employed to replay the gameplay experience of the given user A, for example with respect to highest score, such that the users of the devices 100A, 100B can mutually compete together to determine which of them is capable of achieving a highest score, together with proof, namely verification, of having attained the highest score by way of being able to replay data streams which demonstrate attainment of the highest score in a verifiable manner. Optionally, the two users bet money on which of them is capable of achieving a highest score, for example within a defined timeframe. Optionally, the gameplay experience sharing service 310 is responsible for crediting the winner and debiting the loser in such a bet electronically directly from their bank accounts.

Figure 3:
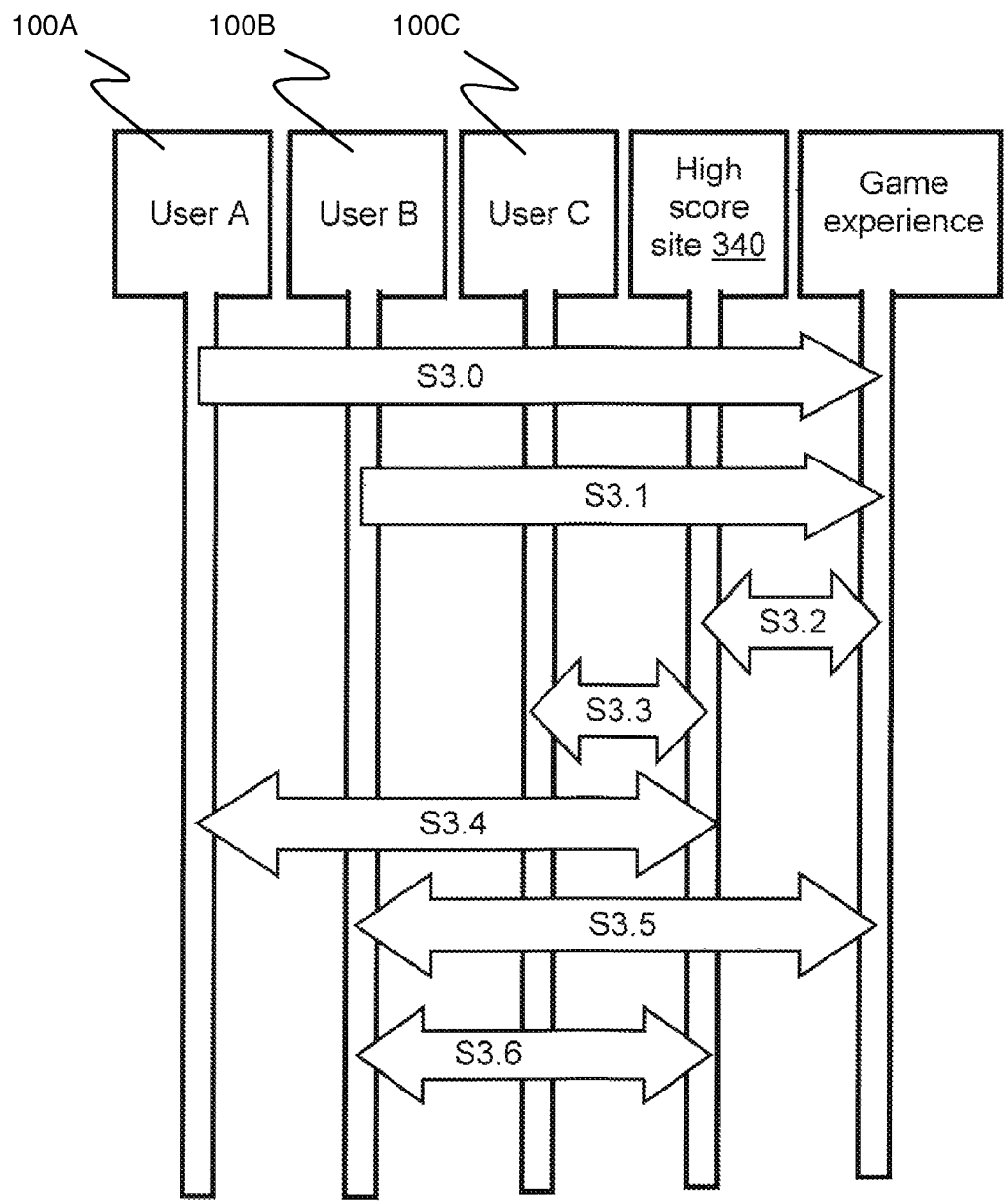
FIG. 3 is an illustration of data exchange occurring within the system of FIG. 2 when in operation.

Referring next to FIG. 3, there is shown a chart of interactions occurring within the system 300 of FIG. 2. Users A, B and C each are equipped with their devices 100A, 100B, 100C which, as aforementioned, have capability of capturing all or some of gameplay experiences via the aforesaid GESW library components, as well as a record of gameplay statistics.

In a step S3.0, the device 100A of the given user A sends an achieved score by user A together with associated gameplay experience data, for example UserFace Video and Game Video data streams, to the gameplay experience service 310. Moreover, in a step S3.1, the device 100B of the user B sends an achieved score by user B together with associated gameplay experience data, for example UserFace Video and Game Video data streams, to the gameplay experience service 310. In a similar manner, other users, for example the user C, can send their score and related gameplay experience videos to the gameplay experience service 310.

An embedded high score leaderboard is included in the games products employed in the devices 100A, 100B, 100C the system 300, for example by way of a developer employing a software development kit (SDK) when developing the games products and/or at the gameplay experience service 310; in a step S3.2, the high score is communicated to the gameplay experience service 310, for example optionally to a high-score web site 330 associated with the service 310 or separate therefrom. For example, the leaderboard SDK can download all or part of the gameplay data, or the leaderboard SDK can access information content needed to provide a scoring service. Optionally, the leaderboard SDK does not download the information, but rather embeds videos and other information within a given host game software product, for example an arbitrary game or application or web-site content. As aforementioned, the leaderboards can, for example, be integrated seamlessly to host games software products, thereby displayed as an embedded element when the game software products are executed upon computing hardware.

In a step S3.3, the user C, having software products on his/her device 100C which support the leaderboard, or via a browser operable to handle Hypertext transfer protocol (HTTP), is able to inspect the leaderboard and also invoke replay of associated gameplay experiences. Videos provided to the user C are, for example, embedded in Hypertext markup language (HTML) code for consumption by the user C.

In a step S3.4, the user A is capable of accessing the gameplay experience service 310, namely via a games software product which has GESW features for accessing the service 310. Thus, the user A is able to access the service 310 either via a web browser or via a games software product, which includes aforementioned GESW software components.

Additionally, or alternatively, in a step S3.5, the user B having a games software product installed on his/her device 100B that has GESW features is also capable of accessing the leaderboard for accessing high scores recorded therein. Accessing the high score data optionally includes accessing more detailed games experience data in addition to associated gameplay experience video, for example additional information such as game-related sensor data, gesture data and so forth. Moreover, in a step S3.6, the user B is capable of accessing the high score web-site 340 associated with the service 310. Optionally, the information content accessed by the user B can access some or all of recorded data from the game high-score web-site 340 associated with the service 310, wherein the information content can include comments from other users.

Figure 4:
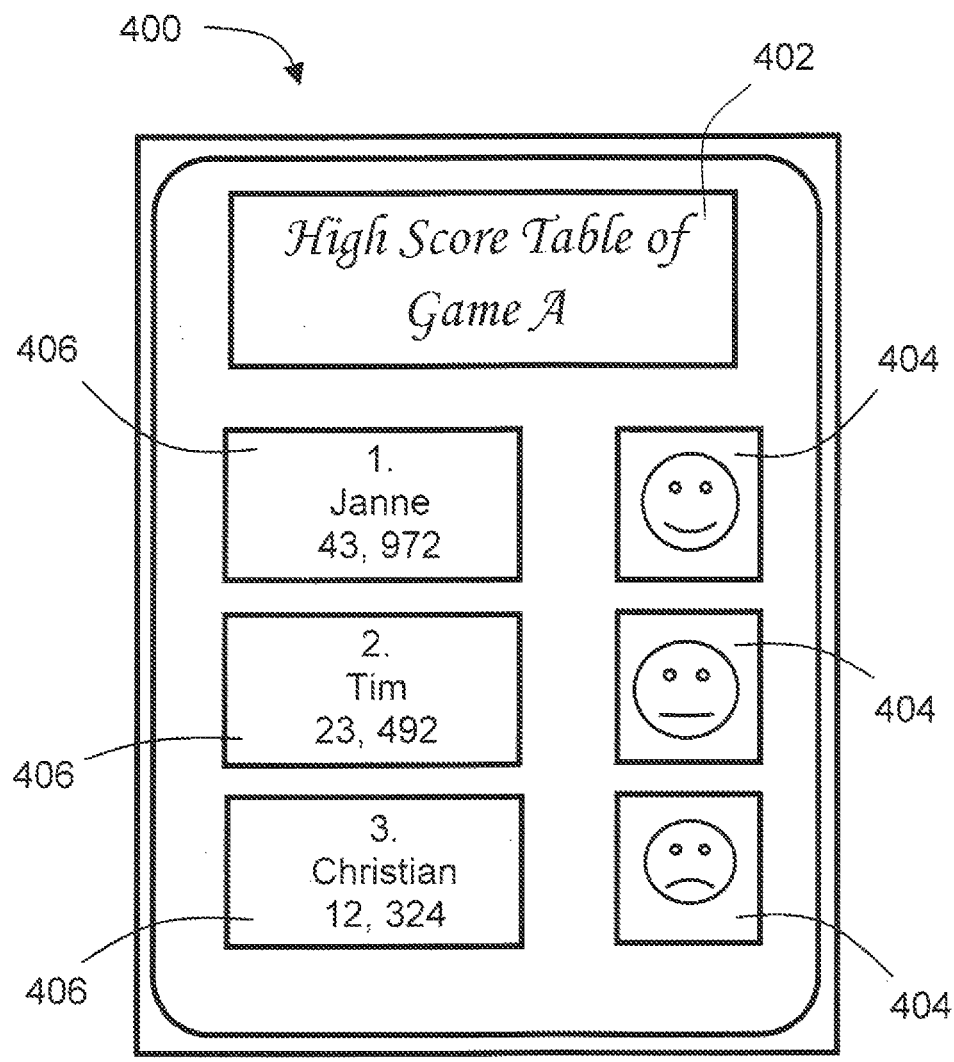
FIG. 4 is an illustration of a score list provided by the system of FIG. 2.

In FIG. 4, there is illustrated an example view of a leaderboard as denoted by 400. The leaderboard 400 can be shown on a display, screen or web-page, depending upon implementation of the system 300. The leaderboard 400, namely score board, beneficially includes a field 402 for presenting a title describing the name of the game, for example "Game A".

Optionally, the leaderboard 400 is implemented as an interface with screen-menus, pop-up menus, view menus, pull down menus, pop up menus and so forth, for example to change the title in the field 402. The leaderboard 400 also includes a field 406 for a name of the user, for example sorted in an arbitrary manner, for example in a manner such that a user attaining a highest score is shown first on a list, a user attaining a next highest score is shown next on the list, and so forth. Optionally, each user name included in the list has an accompanying thumbnail image 404 of the user, for example clicking on the thumbnail image causes an associated gameplay experience of the user to be presented. Optionally, the leaderboard 400 includes, or enables access to, games events and statistical data collected in respect of all games, thereby enabling user performances to be mutually compared, for example "World master in battlefield *The Land of Thor*" and such like. A given user is thereby capable of comparing his/her performance within a given social group supported via the system 300. Other criteria are optionally used for controlling presentation of information of the leaderboard 400, for example weekly leaderboards, geolocated leaderboards (for example Turku, Finland environs leaderboard). Optionally, the leaderboard 400 includes advertisement promotions, for example "*The Land of Thor*" tea shirts, Lordi monster mugs and scarves; "Lordi" is a registered trademark.

The gameplay experience as shown to the users depends upon a nature of their devices 100, and also a manner in which their devices 100 are user-configured. When accessing games scores, one method involves showing video via a browser, optionally with the video proposed by a player of the game who was responsible for the video. Optionally, when replaying the gameplay experience, a viewing user has buttons presented to them within a video display field which enables the viewing user to select amongst different video streams and other game experience streams such as gestures etc generated by the player of the game, for example the user A as described in the foregoing.

When viewing a gameplay experience at one or more of the devices 100A, 100B, 100C, the viewing experience can be user-adjusted by toggle various optional features and filters. A viewing user is, for example, capable of integrating a portion of gameplay experience of another user, for example a portion of game video of a particular user having attained a highest score on the leaderboard 400, and add the viewer's own gameplay experience to create a composite video creation for uploading to the service 310 and for further dissemination therefrom to other users. This allows for the creation of composite videos with extracts from different players, for example in a highly competitive context.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

We claim:

1. A system for sharing gameplay score experiences, wherein the system comprises:
    one or more devices on which one or more games are played;
    a gameplay experience service arrangement; and
    a communication arrangement for communicatively coupling the one or more devices to the gameplay experience service arrangement, wherein the one or more devices include computing hardware for executing one or more games software products for implementing the one or more games when executed upon the computing hardware, wherein the one or more devices are configured to:
        record a gameplay experience played thereupon as multiple individual data streams and an associated score, the multiple individual data streams including a game video, a player video, game event data, microphone sounds, game sounds, game control, game statistics and user interface data and being recorded with temporal information identifying when an event occurred during playing of the game and linking the multiple individual data streams;
        share only selected ones of the multiple individual data streams corresponding to the recorded gameplay experience; and
        upload the shared individual data streams of the recorded gameplay experience as individual data streams, and the associated score, to the gameplay experience service arrangement which maintains a score list corresponding to uploaded gameplay experiences, and wherein the score list is accessible to the one or more devices for identifying gameplay performances of users of the one or more devices; and
    wherein the gameplay experience service arrangement is configured to:
        detect a request for replay of an uploaded gameplay experience on the score list from a requesting device of the one or more devices;
        detect, in the request, a selection of individual ones of the shared individual data streams to be replayed; and
        download the selected individual ones of the individual data streams to the requesting device for replay, the selected individual ones of the individual data streams including a high score associated with the requested gameplay experience and events of the gameplay experience indicating how the high score was achieved.

2. The system as claimed in claim 1, wherein uploaded gameplay experiences comprise a plurality of the individual data streams, the plurality of individual data streams being recorded in real-time during playing of the one or more games.

3. The system as claimed in claim 1, wherein the individual data streams generated at the one or more devices are user-editable before being uploaded as individual data streams to the gameplay experience service arrangement.

4. The system as claimed in claim 1, wherein the score list is accessible via the one or more devices, and the score list includes links for replaying gameplay experiences associated with scores presented on the score list.

5. The system as claimed in claim 1, wherein the score list is maintained in an internet web site, and accessible from the one or more devices using browser software in the one or more devices.

6. The system as claimed in claim 1, wherein the one or more games software products are host games software products into which one or more software components from a GESW API software library have been incorporated.

7. The system as claimed in claim 1, wherein the one or more devices are wireless-enabled devices implemented by way of at least one of: a smart phone, a laptop computer, a personal computer, a pad computer and a tablet computer.

8. A method of sharing gameplay score experiences using a score sharing system, wherein the method includes:
   using one or more devices of the score sharing system for playing one or more games;
   communicatively coupling the one or more devices via a communication arrangement to a gameplay experience service server, wherein the one or more devices include computing hardware for executing one or more games software products for implementing the one or more games when executed upon the computing hardware;
   recording on the one or more devices a gameplay experience played thereupon including an associated score, the game play experience being recorded as multiple individual data streams, the multiple individual data streams including a game video, a player video game event data, microphone sounds, game sounds, game control game statistics and user interface data and being recorded with temporal information identifying when an event occurred during playing of the game and linking the multiple individual data streams;
   identify for sharing selected ones of the multiple individual data streams corresponding to the recorded gameplay experience;
   uploading from the one or more devices the shared data streams of the recorded gameplay experience and the associated score to the gameplay experience service server to generate uploaded gameplay experiences;
   maintaining a score list corresponding to the uploaded gameplay experiences, and wherein the score list is accessible to the one or more devices for identifying relative gameplay performances of users of the one or more devices;
   detecting a request in the gameplay experience service server for a replay of an uploaded gameplay experience on the score list from a requesting device of the one or more devices;
   detecting, in the request, a selection of individual ones of the shared individual data streams of the requested gameplay experience to be replayed; and
   downloading the selected individual ones of the shared data streams of the requested gameplay experience to the requesting device for replay, the selected data streams including a high score associated with the requested gameplay experience and events of the gameplay performance indicating how the high score was achieved.

9. The method as claimed in claim 8, wherein the uploaded gameplay experience comprises one or more different data streams, the different data streams recorded in real-time in the one or more devices during playing of games thereupon.

10. The method as claimed in claim 8, wherein the different data streams generated at the devices are user-editable before being uploaded to the gameplay experience service server.

11. The method as claimed in claim 8, wherein the score list is accessible via the one or more devices, and the score list includes links for replaying gameplay experiences associated with scores presented on the score list.

12. The method as claimed in claim 8, wherein the score list is maintained in an Internet web site, and accessible from the devices using browser software in the devices.

13. The method as claimed in claim 8, wherein the one or more games software products are host games software products into which one or more software components from a GESW API software library have been incorporated.

14. The method as claimed in claim 8, wherein the one or more devices are wireless enabled devices implemented by way of at least one of: a smart phone, a laptop computer, a personal computer, a pad computer and a tablet computer.

15. A software product recorded on non-transitory machine-readable data storage media, wherein the software product is executable upon computing hardware for implementing a method as claimed in claim 8.

16. The system as claimed in claim 1, wherein the requesting device is configured to integrate a gameplay performance of the requesting device with the requested replay of the uploaded gameplay experience to generate a composite video for uploading to the gameplay experience service arrangement.

17. The method as claimed in claim 8, wherein the requesting device is configured to:
   integrate a gameplay performance of the requesting device with the requested replay of the uploaded gameplay experience; and
   generate a composite video for uploading to the gameplay experience service arrangement.

18. The method as claimed in claim 8, wherein the game statistics include a player reaction time, a percentage of successful shots and a number of fouls.

* * * * *